United States Patent [19]

Börner et al.

[11] 4,161,487

[45] Jul. 17, 1979

[54] PROCESS FOR THE HYDROLYSIS AND CONDENSATION OF ALKYL/ARYL-TRICHLOROSILANES

[75] Inventors: Dieter Börner; Götz Koerner, both of Essen; Gerd Rossmy, Haltern, all of Fed. Rep. of Germany

[73] Assignee: Th. Goldschmidt AG, Essen, Fed. Rep. of Germany

[21] Appl. No.: 843,219

[22] Filed: Oct. 18, 1977

[30] Foreign Application Priority Data

Oct. 26, 1976 [GB] United Kingdom .............. 44490/76

[51] Int. Cl.$^2$ ................................................ C07F 7/08
[52] U.S. Cl. ........................ 260/448.2 R; 260/448.2 C
[58] Field of Search ................... 260/448.2 R, 448.2 E

[56] References Cited

U.S. PATENT DOCUMENTS

| 3,489,782 | 1/1970 | Pruvost et al. ................ 260/448.2 E |
| 3,687,642 | 8/1972 | Koerner ..................... 260/448.2 E X |

*Primary Examiner*—Paul F. Shaver
*Attorney, Agent, or Firm*—Toren, McGeady and Stanger

[57] ABSTRACT

A method for hydrolysis and condensation of alkyl/aryl-trichlorosilanes wherein the chlorosilanes are dissolved in liquid hydrogen chloride and the solution is hydrolized at a pressure of 15 to 80 atmospheres and at a temperature of $-17°$ to $+47°$ C. and water is present in an amount of 0.165 to 0.465 moles per chlorine atom attached to a silicon atom. After condensation, the reaction product is freed from hydrochloric acid and unhydrolyzed silanes. Also disclosed are new chlorosilanes prepared by the process of the invention.

10 Claims, No Drawings

PROCESS FOR THE HYDROLYSIS AND CONDENSATION OF ALKYL/ARYL-TRICHLOROSILANES

BACKGROUND OF THE INVENTION

1. Field of the Invention

The invention relates to a process for the hydrolysis and condensation of alkyl/aryl-trichlorosilanes which may contain up to 40 mole % of dialkyl or diaryl or alkylaryl-dichlorosilanes.

2. Description of the Prior Art

The hydrolysis of halogen silanes usually takes place in open systems of the kind wherein halogen silanes are added to water which is already present. However, this method does not allow alkyl/aryl-trichlorosilanes or silane mixtures, which contain the trichlorosilanes predominantly, to be hydrolized without gelling the reaction products. "Chemie and Technologie der Silicone" (Chemistry and Technology of the Silicones) by Walter Noll, published by Chemie GmbH in 1968, Page 164, states that methyltrichlorosilane forms highly cross-linked gel-like or powder-like polymers on being hydrolyzed with water. The other know processes of hydrolysis are also dealt with in this book. It is reported, for example, that trichlorosilanes can be hydrolyzed in the presence of larger amounts of solvents which dilute the reaction medium. However, when using trichlorosilanes having bulky organic groups and ether as the solvent, only low molecular weight cyclic siloxanes are primarily obtained.

The hydrolysis of trichlorosilanes can also be carried out with water/alcohol mixtures. In this instance also, the concomitant use of solvents is customary so that this process is expensive and does not completely avoid the danger of gelling when high proportions of trichlorosilanes are present in the silane mixture.

The well known "reverse hydrolysis" process in which water is added to halogen silanes also leads to complete gelling of the reaction products when trichlorosilanes are hydrolized, even in the presence of solvents.

Hydrolysis at lower temperatures, e.g., at $-73°$ C. in ether leads to low molecular weight chlorosiloxanes with a high residual chlorine content. The ratio of chlorine to silicon in these compounds is greater than 1.

It is a particular disadvantage of these processes that portions of the halosilane starting materials are carried along with the hydrogen chloride liberated in the reaction. As a consequence, the composition of the reaction mixture in relation to the chlorosilane starting material changes uncontrollably during the reaction so that the reproducibility of the products manufactured is impaired.

The gaseous HCl which escapes cannot be utilized further since it is contaminated by silanes. It must therefore be neutralized. The conventional processes are therefore disadvantageous since the waste air and water produced must be further treated before disposal. Also, the chlorine of the chlorosilane starting materials is lost for further use. Also, the halogen silanes which are carried off are deposited and collected on various surfaces of the equipment, especially in the waste air lines, where they are hydrolyzed by the moisture in the air. In addition to the waste of the materials, the collection of these materials creates the danger of further corrosion.

SUMMARY OF THE INVENTION

We have discovered a method for hydrolyzing alkyl/aryl-trichlorosilanes which avoids many of the disadvantages of the known processes. Particularly, the object of the present invention is to hydrolyze and condense alkyl/aryl-trichlorosilanes and mixtures which may contain up to 40 mole % of dialkyl or diaryl or alkylaryldichlorosilanes in such a manner that there is no gelling of the reaction products and highly viscous or fusible condensation products are obtained which are soluble in organic solvents, such as, toluene. At the same time, the hydrolysis of the pure alkyltrichlorosilane, particularly of methyltrichlorosilane, is preferred and of particular industrial interest.

A further object of the present invention is to avoid the concomitant use of organic solvents in the hydrolysis and condensation reactions to minimize the burden with respect to the waste air and water. Thus, the silanes and water should be the only starting materials required.

The present process is carried out by dissolving chlorosilanes in liquid hydrogen chloride and hydrolyzing them at a pressure between 15 to 80 atmospheres and a temperature of $-17$ to $+47°$ C. with 0.165 to 0.465 moles of water per chlorine atom attached to a silicon atom and, after subsequent condensation, freeing the reaction product from HCl and silanes that have not been hydrolized using conventional techniques.

Preferably, the reaction product is freed from HCl and silanes that have not been hydrolized by releasing the pressure and/or increasing the temperature.

DESCRIPTION OF THE PREFERRED EMBODIMENT

The preferred alkyltrichlorosilanes are those in which the alkyl group contains 1 to 4 carbon atoms and the most preferred alkyl group is methyl. However, those silanes whose alkyl group is longer than 4 carbon atoms, for example, alkyl groups with even 12 to 18 carbon atoms, may also be reacted. Additionally, the alkyl group may be linear or branched.

Thus, mixtures of alkyltrichlorosilanes and aryltrichlorosilanes are preferably used if the incorporation of aryl groups into the siloxane skeleton is desired. The alkyl/aryl groups are defined as above for those cases where diorganodichlorosilanes are used concomitantly.

Liquid hydrogen chloride is used as the solvent in the process of the present invention. At the end of the reaction, this hydrogen chloride, together with the hydrogen chloride formed during the reaction, can be transported in the gaseous state by releasing the pressure in the reaction vessel. It may then be compressed once again and supplied to a second reaction batch or completely or partially drawn off and used for a different purpose.

At the same time, it is of particular significance that the hydrogen chloride is obtained in a very pure form, so that the contamination problems and waste air and water problems which occur in the prior art process do not occur. No extraneous solvent is required nor is it necessary to neutralize the hydrogen chloride. Alternatively, the hydrogen chloride may also be distilled off while maintaining an adequate pressure for this purpose and condensed again directly into the liquid form by cooling.

The rate of the reaction can be influenced by the amount of liquid hydrogen chloride used and particularly by the temperature and pressure conditions used. It is best to dissolve very reactive trichlorosilanes in larger amounts of hydrogen chloride and carry out their hydrolysis at lower temperatures than those trichlorosilanes whose hydrocarbon residues decrease the reactivity, for example, by their bulkiness. In the case of propyltrichlorosilane, for example, the amount of liquid hydrogen chloride is kept very small and the hydrolysis is carried out at an elevated reaction temperature.

In general, it is advisable to use an amount of liquid hydrogen chloride that is approximately equal in volume to that of the chlorosilane to be hydrolyzed. The use of an amount of solvent greater than twice the volume of the silane is not recommended since it impairs the space-time results which are particularly efficient in this process.

The water required for the hydrolysis is advisably added in the form of an aqueous solution of HCl. It has proven to be especially advantageous to use a concentration of HCl in water that corresponds to the solubility of HCl in water under the reaction conditions used for the process. This requires the aqueous HCl solution to be prepared first in a separate pressure vessel.

In a preferred embodiment of the present process, the halogen silanes are dissolved in liquid hydrogen chloride in a first pressure reactor and sufficient HCl is dissolved in the water required for the hydrolysis so that a solution is obtained which is saturated under the conditions existing in the first pressure reactor. This solution of HCl in water is now fed either continuously or discontinuously into the pressure reactor through the appropriate piping. The aqueous HCl solution is added in proportion to the rate of the reaction of the water with the halogen silane.

The rate of reaction can be readily recognized by the fact that the aqueous HCl solution added is not miscible with the silane/HCl phase already present so that two separate layers are formed. If the reactants are stirred, these two layers become dispersed. The interfaces disappear as the reaction proceeds. It is therefore possible to follow the addition of HCl-saturated water visually and to control it so as to correspond to the reaction rate.

Since a reaction temperature of $+20°$ C. must not be exceeded for highly reactive halogen silanes, such as, the methyltrichlorosilanes and since the optimum range of the reaction temperature lies between $-10°$ and $+10°$ C., the pressure reactor may have have to be cooled.

The addition of the required amount of water may be followed by a post-reaction time of 15 minutes to 2 hours before the pressure in the reactor is released or before the hydrogen chloride is distilled off. When the pressure is released after the reaction is completed, very pure HCl gas escapes which, as noted above, is used for the next reaction batch or may be compressed and filled into cylinders for a different use.

The reaction product obtained may be heated by raising its temperature up to $200°$ C. At the same time, the residual hydrogen chloride contained in the siloxane and, depending on the degree of hydrolysis achieved, the residual in any unconverted halogen silane escape. The reaction products so obtained are free of silanol groups at least to the extent that such groups can not be detected by IR spectroscopy.

The product obtained by the inventive process is a siloxane of the general formula

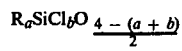

wherein
R is the hydrocarbon group of the starting silane,
a has a value of 1.0 to 1.4 and can be calculated from the amount of the diorganodichlorosilane,
b has a value of 0.18 to 0.5.
The sum of a+b is 1.2 to 1.70.

It is evident from the formula that the siloxane obtained still contains a certain amount of chlorine. The product is therefore readily accessible to further reactions that attack the SiCl bond. At the same time, it should be noted that these reactive chlorine atoms are present in a highly cross-linked siloxane skeleton, particularly in the case where the value of 'a' is low. Such chlorosiloxanes could not be obtained without gelling in a fusible state or of a viscous consistency with the conventionally known processes.

The invention therefore also relates to new compounds of the general formula

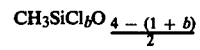

in which b has a value of 0.2 to <0.5.

Examples of chlorosiloxanes that may be prepared in accordance with the invention are:

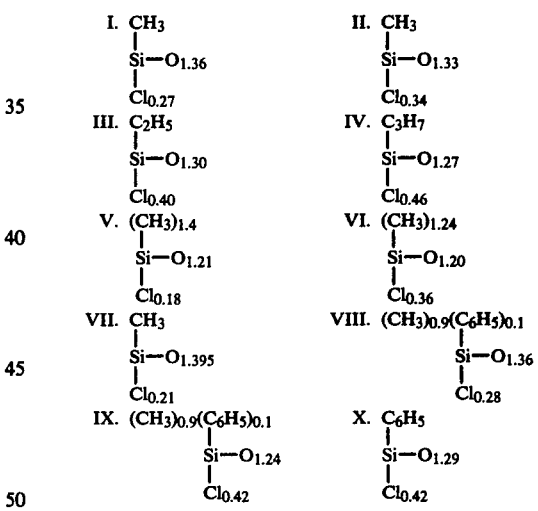

The chlorine atoms in these compounds are terminal groups.

The inventive process has the advantages that
(1) the reaction products do not gel,
(2) it is possible to work without requiring additional organic solvent,
(3) silane contamination of the equipment and of the HCl gas is avoided,
(4) problems with waste air and waste water do not arise,
(5) neutralization is not required, and
(6) the products can be obtained with excellent reproducibility.

As is evident from the description of the present process, no more than 0.465 moles of $H_2O$ per mole of SiCl may be employed. Above this limit, insoluble gels are obtained from methyltrichlorosilane. On the other hand, the less the amount of water used, the greater the amount of chlorosilane that remains unreacted. This is surprising since the chlorosilanes are highly reactive substances which are susceptible to hydrolysis. Too small an amount of water is not recommended because of the volume and time yields. The lower limit of water that may be added is thus based on this factor.

Especially preferred is the synthesis of compounds corresponding to Formulas I and II from methyltrichlorosilane which is obtained in surplus amounts from the synthesis of silanes. As a result of the reactive SiCl groups, which are still present in sufficient amounts in products of these Formulas I or II and because of the good solubility, such materials can be processed into other valuable products.

The following examples illustrate the present process:

EXAMPLE 1

475 g (2.97 moles) of methyltrichlorosilane are added to a pressure reactor into which 700 ml of hydrogen chloride are then condensed at a temperature of $-8°$ C. 71.8 g of water (3.98 moles), corresponding to 0.448 moles of water per chlorine atom attached to a silicon atom, are added in the form of a 37% hydrochloric acid solution to a second pressure vessel and saturated under an HCl gas pressure of 30 kilopond/cm² (kp/cm²). Subsequently, the aqueous hydrochloric acid is introduced to the hydrolysis reactor in proportion to the amount consumed. The hydrolysis is completed after a reaction time of 6.5 hours at a reaction temperature of $-8°$ to $+2°$ C.

The chlorosiloxane obtained is discharged into a receiver for further processing. Traces of methyltrichlorosilane (0.4 g) are removed by heating the hydrolysis product to 90° C. at 30 torr.

The acid value of the viscous pressure-hydrolysis product is $4.44 \times 10^{-3}$ equivalents per gram. This value corresponds to the general formula

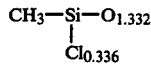

EXAMPLE 2

302 g of methyltrichlorosilane (2.02 moles) are added to a pressure-hydrolysis reactor and dissolved in 250 ml of condensed hydrogen chloride. 49.0 g of water (2.72 moles), corresponding to 0.449 moles of water per chlorine atom attached to a silicon atom are filled in the form of a 37% hydrochloric acid solution into a second pressure vessel and saturated under an HCl gas pressure of 45 kp/cm². The hydrolysis is carried out at reaction temperatures between $-7°$ C. and $+2°$ C. by the slow addition of aqueous hydrochloric acid solution into the hydrolysis reactor during a period of 7 hours. The hydrogen chloride present in the system is subsequently removed by evaporation and the hydrolysis product is transferred to a receiver under inert gas pressure.

The product is freed from HCl residues by heating it to 90° C. for 0.5 hours at a pressure of 30 torr. At the same time, 2.9 g of a distillate having an acid value of $1.82 \times 10^{-2}$ equivalents per gram are collected.

The hydrolysate obtained has an acid value of $3.67 \times 10^{-3}$ equivalents per gram, a Cl/Si ratio of 0.27 and is readily soluble in toluene. The general formula

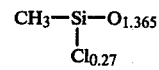

corresponds to this reaction product. In the solvent-free state, the reaction product solidifies at room temperature and softens at 80° C.

EXAMPLE 3

299 g of methyltrichlorosilane (2.0 moles) are added to the pressure-hydrolysis reactor described above and are dissolved in 250 ml of condensed hydrogen chloride. 45.0 g of water (2.5 moles), corresponding to 0.417 moles of water per chlorine atom attached to a silicon atom, are brought in the form of a 37% hydrochloric acid solution into the second pressure vessel and saturated under an HCl pressure of 45 kp/cm². The hydrolysis is carried out within 8 hours at reaction temperatures between $-8°$ C. and $+4°$ C. After evaporation of the liquid hydrogen chloride, a further 17.8 g of CH₃SiCl₃ are removed from the reaction product by heating to 90° C. at 30 torr. The viscous reaction product obtained then has the acid value of $4.435 \times 10^{-3}$ equivalents per gram, corresponding to the general formula:

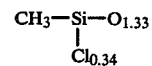

EXAMPLE 4

2.0 moles of CH₃SiCl₃ (299.0 g) are reacted with 2.0 moles of water (36.0 g) corresponding to 0.335 moles of water per chlorine atom attached to a silicon atom, according to the experimental conditions of Example 2. 69.2 g of CH₃SiCl₃ are removed from the HCl-free reaction product. The resulting hydrolysis product has an acid value of $5.39 \times 10^{-3}$ equivalents per gram, which corresponds to an average composition of the formula

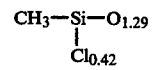

EXAMPLE 5

266 g of n-propyltrichlorosilane (1.5 moles) are mixed with 150 ml of condensed hydrogen chloride in an apparatus like that of Example 1. The hydrolysis is carried out at reaction temperatures between 20° C. and 27.5° C. with 31.6 g (1.75 moles) of water, corresponding to 0.385 moles of water per chlorine atom attached to a silicon atom, the water being in the form of a 37% hydrochloric acid solution which has been saturated under an HCl-gas pressure of 56 kp/cm². The resultant highly concentrated hydrochloric acid is added to the hydrolysis reactor within 4 hours.

After a reaction time of 6 hours, the reaction product is freed from the remaining HCl-gas pressure and the resulting chlorosiloxane is filled into a separate receiver.

The reaction product is subsequently free from the adhering HCl and residual n-propyltrichlorosilane at a temperature of 150° C. and in a vacuum produced by an oil pump. In so doing, 22.9 g of propyltrichlorosilane are recovered. The chlorosiloxane produced is obtained as a highly viscous liquid with an acid value of $3.95 \times 10^{-3}$ equivalents per gram. It therfore corresponds to the general composition $$\begin{array}{c} \text{n-C}_3\text{H}_7\text{SiO}_{1.29} \\ | \\ \text{Cl}_{0.42} \end{array}$$

EXAMPLE 6

150 ml of hydrogen chloride are condensed at $-6°$ C. into a silane mixture, consisting of 0.76 moles of methyltrichlorosilane (113.6 g) and 0.5 moles of dimethyldichlorosilane (64.6 g) in a pressure reactor. Over a period of 5.5 hours, 1.20 moles of water (21.6 g), corresponding to 0.366 moles of water per chlorine atom attached to a silicon atom are added to these chlorosilanes in the form of an aqueous hydrochloric acid solution saturated under an HCl pressure of 36 kp/cm². In so doing, the hydrolysis reaches a maximum temperature of $+6°$ C.

After a further reaction time of 1.5 hours, the reaction product is freed from the solvent HCl by allowing the HCl to evaporate. The separated cohydrolysate is subsequently heated at 150° C. in a vacuum of 30 torr. In so doing, 33.6 g of dimethyldichlorosilane are recovered. The reaction product has and acid value of $4.32 \times 10^{-3}$ equivalents per gram and a viscosity of 7500 cps at 20° C. The chlorosiloxane obtained corresponds to the formula $$\begin{array}{c} (\text{CH}_3)_{1.24} \\ | \\ \text{Si}-\text{O}_{1.21} \\ | \\ \text{Cl}_{0.34} \end{array}$$

EXAMPLE 7

1.8 moles of methyltrichlorosilane (269.0 g) and 0.2 moles of phenyltrichlorosilane (42.2 g) are mixed with 400 ml of condensed hydrogen chloride in a pressure reactor.

2.72 moles of water (49.0 g), corresponding 0.453 moles of water per chlorine atom attached to a silicon atom, are metered in the form of a solution saturated at 32 kp/cm² with HCl gas from a separate pressure vessel and within a period of 4.5 hours. The reaction is carried out within a temperature range of $-10°$ C. to $+10°$ C. After the aqueous hydrochloric acid has been added completely, the reaction is continued for a further 2 hours before the solvent HCl is evaporated off completely. A viscous chlorosiloxane with an acid value of $3.46 \times 10^{-3}$ equivalents per gram is obtained as reaction product. This product corresponds to the formula $$[(\text{CH}_3)_{0.9}/(\text{C}_6\text{H}_5)_{0.1}] - \underset{\underset{\text{Cl}_{0.28}}{|}}{\text{Si}} - \text{O}_{1.36}$$

EXAMPLE 8

423.2 g (2.0 moles) of phenyltrichlorosilane are introduced into a pressure hydrolysis apparatus and mixed with 600 ml of liquid hydrogen chloride. This silane is hydrolyzed in the temperature range of 15° to 22° C. by the addition of 45 g (2.5 moles) of water, corresponding to 0.417 moles of water per chlorine atom attached to a silicon atom. This water is added to a separate reactor as 37% hydrochloric acid and saturated under an HCl-gas pressure of 45 kp/cm².

After a hydrolysis time of 3.5 hours, the solvent HCl is evaporated from the reaction product which is then taken from the reaction apparatus as a viscous product.

After the volatile components are eliminated by heating to 125° C. for 2 hours in the vacuum of an oil pump, 11.0 g of phenyltrichlorosilane and a solid reaction product, which is readily soluble in toluene and acetone and which has an acid value of $3.02 \times 10^{-3}$ equivalents per gram, are obtained.

In addition, 2.1 g of benzene are obtained as decomposition product. The acid value obtained corresponds to a product of the general formula $$\left[ \begin{array}{c} \text{C}_6\text{H}_5-\text{Si}-\text{O}_{1.29} \\ | \\ \text{Cl}_{0.42} \end{array} \right].$$

EXAMPLE 9 (outside the scope of the present invention)

489.4 (3.06 moles) of methyltrichlorosilane are added for the purpose of pressure hydrolysis into a reactor into which 700 ml of hydrogen chloride are then condensed at a temperature of $-9°$ C. 77.58 g of water (4.31 moles) corresponding to 0.47 moles of water per chlorine atom (this amount of water is outside the limit of the present process) are added in the form of 37% hydrochloric acid to the second pressure vessel and saturated under an HCl-gas pressure of 30 kp/cm². Subsequently, the aqueous HCl is brought into the hydrolysis reactor at a rate corresponding to the inlet pressure. The hydrolysis is terminated after a reaction time of 7 hours at reaction temperatures from $-9°$ C. to $+7°$ C.

The condensed hydrogen chloride is subsequently removed in gaseous form over a system of three intensive cold traps ($-70°$ C.), whereby these remained free from condensable products. The working up of the product was troublesome because of the presence of gelled silsesquioxide portions.

What is claimed is:

1. A process for the hydrolysis and condensation of alkyl/aryl-trichlorosilanes containing up to 40 mole % of dialkyl, diaryl, or alkylaryldichlorosilanes comprising dissolving the chlorosilanes in liquid hydrogen chloride and carrying out the hydrolysis at a pressure of 15 to 80 atmospheres and a temperature of $-17°$ to $+47°$ C. with water in an amount of 0.165 to 0.465 moles per chlorine atom attached to a silicon atom, and after subsequent condensation, freeing the reaction product from HCl and from silanes that have not been hydrolyzed.

2. The process of claim 1 wherein the reaction product is freed from HCl and silanes that have not been hydrolyzed by releasing the pressure.

3. The process of claim 1 wherein the reaction product is freed from HCl and silanes that have not been hydrolyzed by raising the temperature.

4. The process of claim 1 wherein the reaction product is freed from HCl and silanes that have not been hydrolyzed by releasing the pressure and raising the temperature.

5. The process of claim 1 wherein the water required for hydrolysis is added in the form of an aqueous solution of HCl.

6. The process of claim 5 wherein the required water is added in the form of an aqueous HCl solution which is saturated under the conditions of the reaction.

7. The process of claim 1 wherein the halogen silanes are dissolved in liquid hydrogen chloride in a pressure reactor, gaseous HCl is dissolved in water in a second pressure vessel until a solution is obtained which is saturated with HCl under the conditions in the pressure reactor, feeding the aqueous HCl solution continuously from the pressure vessel into the pressure reactor at a rate corresponding to the rate of the reaction and after the required amount of water has been added, releasing the pressure in the pressure reactor collecting the escaping HCl gas and drawing off the reaction product.

8. The process of claim 7 wherein after adding the water, the mixture is allowed to react for an additional time period of from 15 minutes to 2 hours before releasing the pressure.

9. The process of claim 7 wherein the reaction product is heated to a temperature up to 200° C. before it is drawn off.

10. A compound having the formula $$CH_3SiCl_bO_{\frac{4-(1+b)}{2}}$$

in which b has a value of 0.27 to $<0.42$.